(12) United States Patent
Grimme et al.

(10) Patent No.: US 8,880,754 B1
(45) Date of Patent: Nov. 4, 2014

(54) ROTATIONAL INPUT AREA FOR INFORMATION HANDLING DEVICE

(71) Applicant: Lenovo (Singapore) Pte. Ltd., Singapore (SG)

(72) Inventors: Jason Grimme, Cary, NC (US); Russell Speight VanBlon, Raleigh, NC (US); Dharma Teja Nukarapu, Morrisville, NC (US); Richard Paul Cornwell, Durham, NC (US); Carmelo Antonio Gazzia, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/037,495

(22) Filed: Sep. 26, 2013

(51) Int. Cl.
*G06F 3/06* (2006.01)
*G06F 3/01* (2006.01)
*G06F 1/16* (2006.01)
*G06F 11/30* (2006.01)

(52) U.S. Cl.
CPC .......... *G06F 1/1622* (2013.01); *G06F 11/3051* (2013.01)
USPC ............ 710/16; 710/2; 710/5; 710/8; 710/11; 710/14

(58) Field of Classification Search
None
See application file for complete search history.

(56) References Cited

U.S. PATENT DOCUMENTS

2013/0021247 A1* 1/2013 Pu et al. .................... 345/163

OTHER PUBLICATIONS

Two pictures of Sony Ericsson P800 phone. 2 pp.

* cited by examiner

*Primary Examiner* — Scott Sun
(74) *Attorney, Agent, or Firm* — Ference & Associates LLC

(57) ABSTRACT

An aspect provides an information handling device, including: a housing; an input element connected at an end to the housing in a rotatable fashion, the input element having an input surface and another surface that is opposite to the input surface; one or more processors; and a memory device accessible to the one or more processors and storing code executable by the one or more processors to: detect that the input element has been rotated from a resting position, wherein, in the resting position, the input surface of the input element is fit in a cavity of the housing and the another side of the input element forms a part of the housing exterior surface; and responsive to detecting that the input element has been rotated from the resting position, accept one or more user inputs via the input surface. Other aspects are described and claimed.

20 Claims, 4 Drawing Sheets

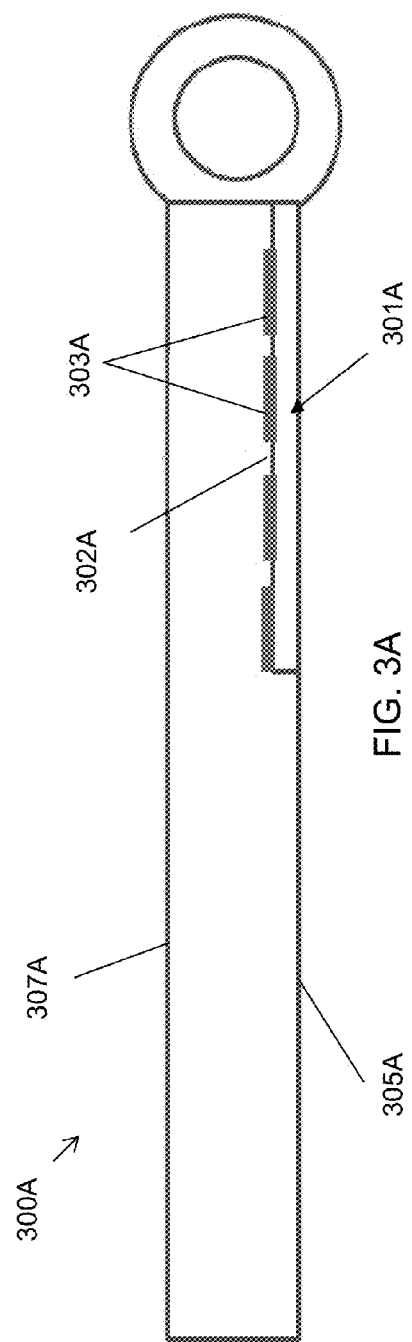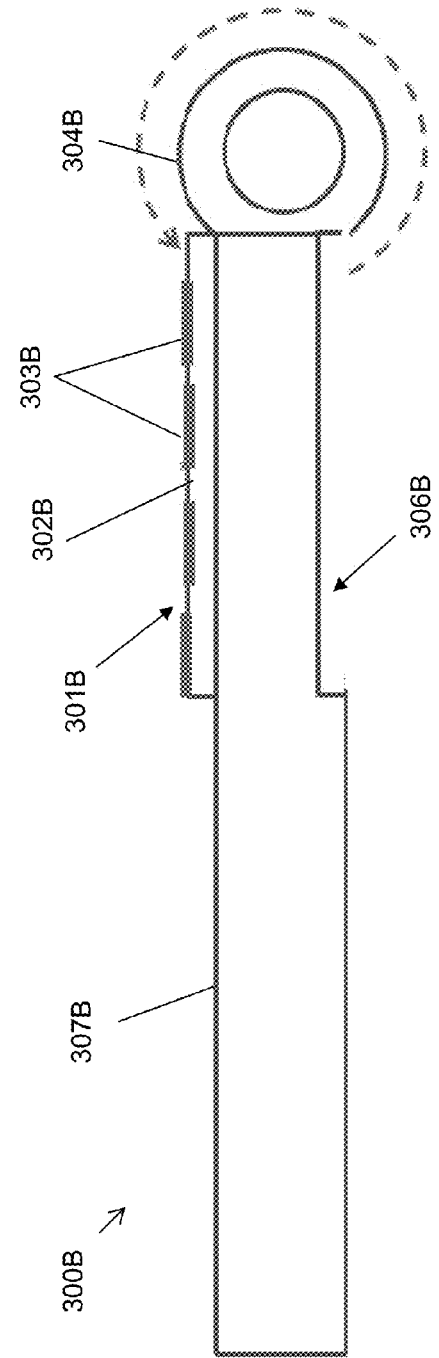

ROTATIONAL INPUT AREA FOR INFORMATION HANDLING DEVICE

BACKGROUND

Information handling devices ("devices"), for example tablets, smart phones, e-readers, etc., often have virtual keyboards. Virtual keyboards are useful but lack the comfort of using a physical keyboard. For users that prefer or need to use a physical keyboard, there is a requirement for a separate (e.g., wireless) or detachable physical keyboard for use with such devices. Some form factors include slide-out keyboards. Examples of information handling devices that are used in combination with a detachable physical keyboard include the MICROSOFT SURFACE tablet computing device. MICROSOFT SURFACE is a registered trademark of Microsoft Corporation in the United States and other countries.

BRIEF SUMMARY

In summary, one aspect provides an information handling device, comprising: a housing; an input element connected at an end to the housing in a rotatable fashion, the input element having an input surface and another surface that is opposite to the input surface; one or more processors; and a memory device accessible to the one or more processors and storing code executable by the one or more processors to: detect that the input element has been rotated from a resting position, wherein, in the resting position, the input surface of the input element is fit in a cavity of the housing and the another side of the input element forms a part of the housing exterior surface; and responsive to detecting that the input element has been rotated from the resting position, accept one or more user inputs via the input surface.

Another aspect provides a method, comprising: detecting that an input element connected at an end to a housing of an information handling device in a rotatable fashion has been rotated from a resting position wherein, in the resting position, an input surface of the input element is fit in a cavity of the housing and another side of the input element forms a part of the housing exterior surface, the input element having the input surface and the another surface that is opposite to the input surface; and responsive to detecting that the input element has been rotated from the resting position, accepting one or more user inputs via the input surface.

A further aspect provides a program product, comprising: a storage device having computer readable program code stored therewith, the computer readable program code comprising: computer readable program code configured to detect that an input element connected at an end to a housing of an information handling device in a rotatable fashion has been rotated from a resting position; the input element having an input surface and another surface that is opposite to the input surface; and computer readable program code configured to, responsive to detecting that the input element has been rotated from the resting position, accept one or more user inputs via the input surface; wherein, in the resting position, the input surface of the input element is fit in a cavity of the housing and the another side of the input element forms a part of the housing exterior surface.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3(A-B) illustrates an example information handling device having a rotational input area.

DETAILED DESCRIPTION

Figure 1:
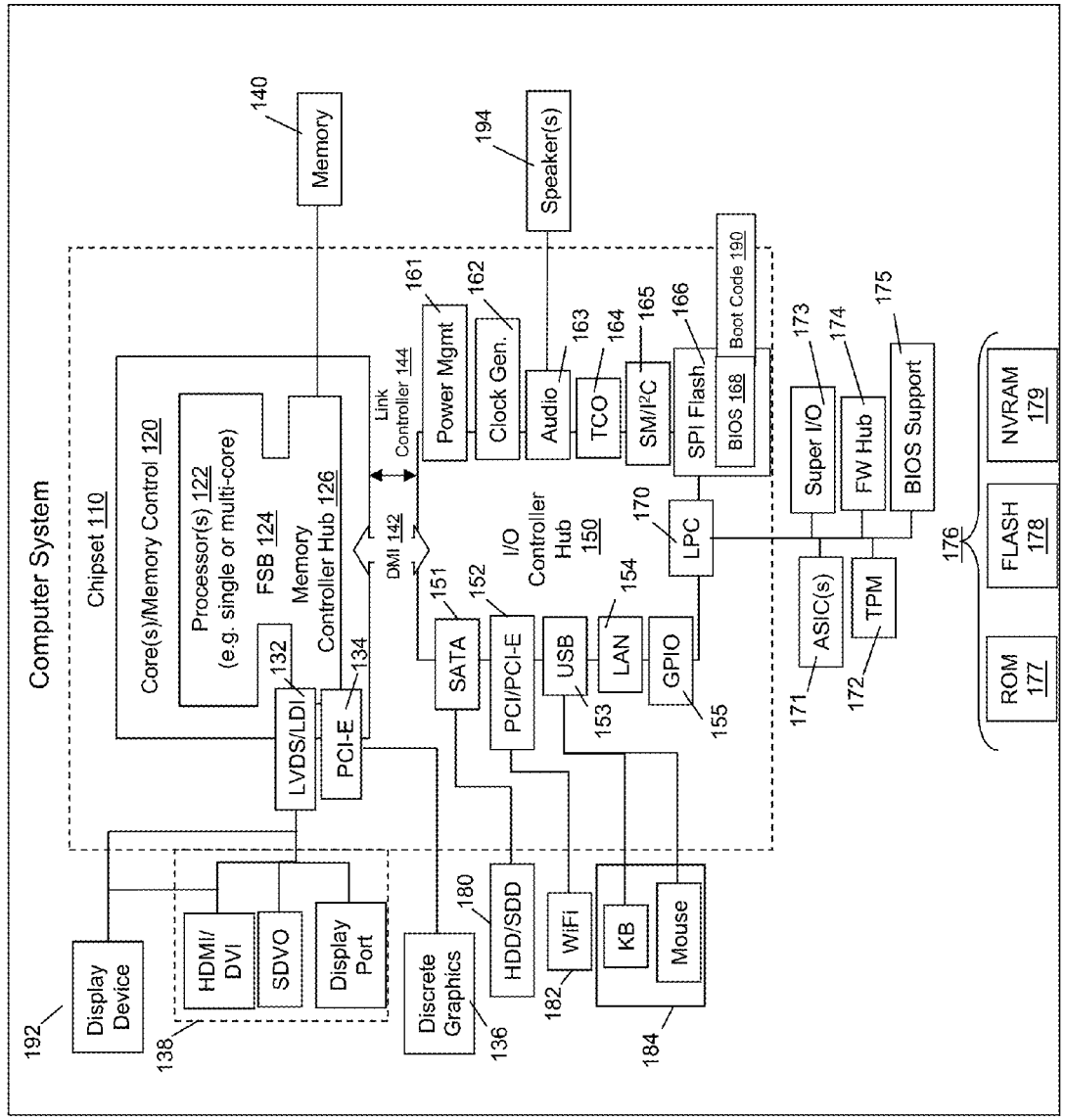
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While virtual keyboards may be augmented or replaced with use of a separate or a detachable physical keyboard, this requires a user to carry and attach or connect the separate physical keyboard. While traditional hinged mechanisms, e.g., clamshell style laptop computers, offer a consistently available physical keyboard, this interferes with the overall appearance and aesthetics of the device, which can no longer be considered a tablet style device. Along the same line, slide-out keyboards exist, but add to the physical size of the device when extended. Thus, currently there are no solutions to the need for providing a tablet form factor while also providing a physical keyboard.

Accordingly, an embodiment provides a physical input area or element, such as a keyboard, that is integrated with the tablet form factor device. Therefore no extra effort (e.g., attachment of a detachable keyboard, etc.) is required to have both the input element and tablet device at the same time. By integrating the input element on a fully-rotational single axis hinge, the input element can flip or rotate 360 degrees onto the existing surface (e.g., display screen such as a touch screen display) of the device, perhaps in the same area where a virtual keyboard would normally appear. In an embodiment, when the input element is activated, e.g., is placed on the viewing surface the device, the device may adjust or resize the viewing area of the display so that the portion that is covered by the input element does not cover or obscure display content. By doing so, no portion of the viewable content is blocked by the input area.

The illustrated example embodiments will be best understood by reference to the figures. The following description is intended only by way of example, and simply illustrates certain example embodiments.

Figure 2:
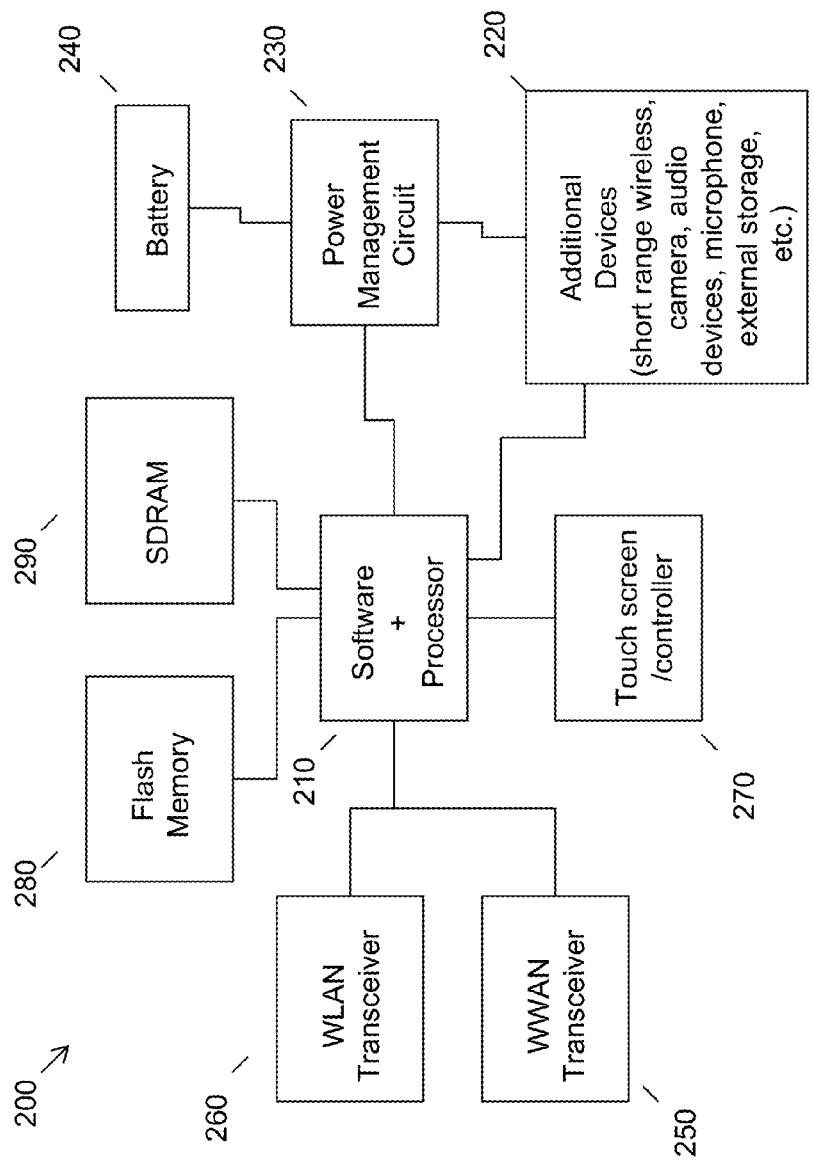
FIG. 2 illustrates another example of information handling device circuitry.

Referring to FIG. 1 and FIG. 2, while various other circuits, circuitry or components may be utilized in information handling devices, with regard to smart phone and/or tablet circuitry 200, an example illustrated in FIG. 2 includes a system on a chip design found for example in tablet or other mobile computing platforms. Software and processor(s) are combined in a single chip 210. Internal busses and the like depend on different vendors, but essentially all the peripheral devices (220) such as a microphone may attach to a single chip 210. In contrast to the circuitry illustrated in FIG. 1, the circuitry 200 combines the processor, memory control, and I/O controller hub all into a single chip 210. Also, systems 200 of this type do not typically use SATA or PCI or LPC. Common interfaces for example include SDIO and I2C.

There are power management chip(s) 230, e.g., a battery management unit, BMU, which manage power as supplied for example via a rechargeable battery 240, which may be recharged by a connection to a power source (not shown). In at least one design, a single chip, such as 210, is used to supply BIOS like functionality and DRAM memory.

System 200 typically includes one or more of a WWAN transceiver 250 and a WLAN transceiver 260 for connecting to various networks, such as telecommunications networks and wireless base stations. Commonly, system 200 will include a touch screen 270 for data input and display. System 200 also typically includes various memory devices, for example flash memory 280 and SDRAM 290.

FIG. 1, for its part, depicts a block diagram of another example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling device circuitry, as for example outlined in FIG. 1 and FIG. 2, may be utilized in various embodiments. For example, as illustrated in FIG. 3(A-B), a device having a rotatable input element is illustrated in an end-on or side view. It should be noted that input area and input element are used interchangeably herein.

Referring to FIG. 3A, a device 300A having an input element 301A in a resting position is illustrated. The resting position may be an inactive position, i.e., the input area 301A is not being used for input but rather is resting in a cavity (illustrated in FIG. 3B at 306B). Here, the input element has an input surface 302A and another surface opposite thereto. The input surface 302A accepts user inputs and communicates these to the system, e.g., for processing. For example, input surface may include physical keys 303A in order to provide a keyboard input surface, e.g., a standard, full QWERTY keyboard.

In the resting position illustrated in FIG. 3A, the input element 301A rests or is fitted into the cavity (306B) such that the opposite side (opposite to input surface 302A) is substantially flush with the outer surface 305A of the device. Thus, when the input element 301A is in a resting or inactive position, it fits within the cavity 306B such that a tablet form factor is maintained with a continuous lower surface 305A and a continuous upper surface 307A containing, e.g., a display screen such as a touch screen display. The inner surface 302A for its part is hidden or not exposed and is adjacent to (e.g., with some clearance) or abuts the underside surface of cavity 306B.

Referring to FIG. 3B, a device 300B is illustrated in which the input element 302B has been rotated about a hinge 304B, which may be a single hinge or a plurality of hinges. Therefore, the input element 301B may be rotated (e.g., as illustrated by the dashed arrow) about the hinge 304B such that it comes to rest on the surface 307B, e.g., a touch screen display or portion thereof. The input element 301A thus has its input surface 302B exposed, e.g., keys 303B are now exposed and ready to be used. The view illustrated in FIG. 3B may be considered an active state or configuration, i.e., the input element accepts input via surface 302B and provides these inputs to the device for processing.

As may be appreciated, the input element 302B is rotated substantially 360 degrees such that the input surface 302B that was hidden in the cavity 306B now is exposed and ready for use. Moreover, it can be appreciated from the example in FIG. 3B that the input element 302B may overlay a portion of the surface 307B, e.g., the input element may overlay a portion of a touch screen display located in surface 307B.

Accordingly, in an embodiment, a resizing or modification of displayed content on surface 307B may take place responsive to detecting that the input element 302B has been placed in an active position. For example, the content displayed on surface 307B may be resized such that the portion of the surface 307B (e.g., display screen) covered by the input element 302B is not utilized. This may correspond to a portion of the surface 307B where a soft or virtual keyboard would normally be located (e.g., when virtual keyboard is used while input element 302A is in a resting or inactive position). Thus, an embodiment may provide two or more keyboards, e.g., a virtual keyboard may also be provided for use when input element 302B is in an inactive or resting position.

Figure 4:
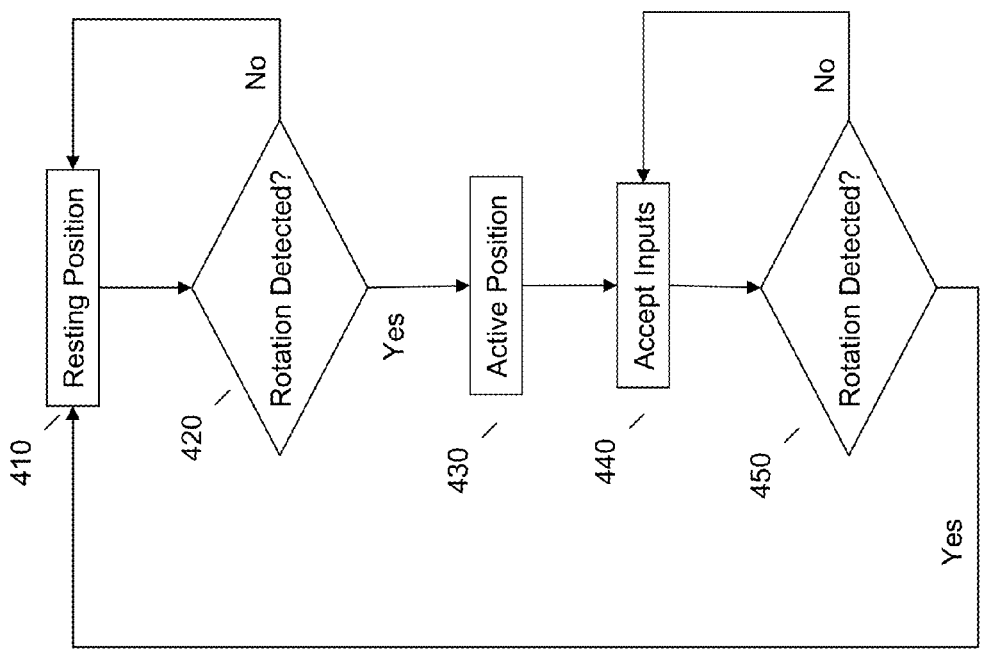
FIG. 4 illustrates an example method of using a rotational input area of an information handling device.

An embodiment may detect that the input element is to be used in a variety of ways. For example, referring to FIG. 4, in a resting position at 410 and embodiment may determine that the input element has been rotated at 420 via using one or more sensors, for example Hall-Effect sensors positioned in the cavity and/or in a display screen bezel and the input element. Thus, an embodiment may determine at 420 that the input element has been rotated away from the cavity, has been rotated proximate to the display surface, detect both, and/or detect that rotation has taken place to some other degree.

The detection of rotation at 420 permits an embodiment to activate the input element at 430. This may take place at a variety of times, e.g., at the beginning of the rotation (e.g., substantially immediately after detecting rotation at 420) or near or shortly after the end of the rotation movement (e.g., shortly after the input element is laid on the display or upper surface of the device).

Once activated, the input element may be used to provide input to the device, which is accepted at 440 by the device for processing. Thus, a user may engage in input activity associated with a physical input element, e.g., typing on keys of a keyboard included in the input element. As described herein, if rotation has been detected at 420, an embodiment may resize or otherwise modify the display screen, for example moving contents on the display screen such that content is not covered up by the footprint of the input element.

At 450, if rotation is detected again, e.g., signifying that the input element has been moved away from the display surface and back towards or into a resting position within the cavity, an embodiment may deactivate the input element and the resting position is again achieved. The detection of rotation 450 may be accomplished in a variety of ways, e.g., similar to detection of rotation at 420. Likewise, any modifications that were made to the content displayed may be reversed responsive to detecting rotation at 450. Moreover, another input element may be used while the input element is in the resting position, e.g., a virtual keyboard.

As may be appreciated from the foregoing, non-limiting examples, an embodiment provides a physical input area or element, such as a keyboard, that is integrated with the device. In an embodiment, when the input element is activated, e.g., is placed on the viewing surface the device, the device may adjust or resize the viewing area of the display so that the portion that is covered by the input element does not display content.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An information handling device, comprising:
a housing;
an input element connected at an end to the housing in a rotatable fashion, the input element having an input surface and another surface that is opposite to the input surface;
one or more processors; and
a memory device accessible to the one or more processors and storing code executable by the one or more processors to:
detect that the input element has been rotated from a resting position, wherein, in the resting position, the input surface of the input element is fit in a cavity of the housing and the another side of the input element forms a part of the housing exterior surface; and
responsive to detecting that the input element has been rotated from the resting position, accept one or more user inputs via the input surface.

2. The information handling device of claim 1, further comprising one or more hinges;
wherein the one or more hinges connect the end of the input element to the housing in a rotatable fashion.

3. The information handling device of claim 1, wherein the input surface of the input element comprises a keyboard having physical keys disposed therein.

4. The information handling device of claim 3, wherein the keyboard comprises a QWERTY keyboard.

5. The information handling device of claim 1, further comprising one or more sensors to detect that the input element has been rotated from a resting position.

6. The information handling device of claim 1, wherein, in the resting position, the another side of the input element is substantially flush with the housing exterior surface.

7. The information handling device of claim 1, further comprising a display screen disposed in the housing on an opposite side of the cavity of the housing.

8. The information handling device of claim 7, wherein the code is further executable by the one or more processors to, responsive to detecting that the input element has been rotated from the resting position, resize content displayed on the display screen.

9. The information handling device of claim 8, wherein the content is resized to substantially accommodate the input element overlaying a portion of the display screen.

10. The information handling device of claim 8, wherein the portion of the display screen is collocated with an area of the display screen occupied by a virtual keyboard.

11. A method, comprising:
detecting that an input element connected at an end to a housing of an information handling device in a rotatable fashion has been rotated from a resting position wherein, in the resting position, an input surface of the input element is fit in a cavity of the housing and another side of the input element forms a part of the housing exterior surface, the input element having the input surface and the another surface that is opposite to the input surface; and
responsive to detecting that the input element has been rotated from the resting position, accepting one or more user inputs via the input surface.

12. The method of claim 11, wherein detecting that an input element has been rotated from a resting position comprises detecting that the input element has been rotated about one or more one or more hinges connecting the end of the input element to the housing in a rotatable fashion.

13. The method of claim 11, wherein the input surface of the input element comprises a keyboard having physical keys disposed therein.

14. The method of claim 13, wherein the keyboard comprises a QWERTY keyboard.

15. The method of claim 11, wherein detecting that an input element has been rotated from a resting position comprises further comprises using one or more sensors to detect that the input element has been rotated from a resting position.

16. The method of claim 11, wherein, in the resting position, the another side of the input element is substantially flush with the housing exterior surface.

17. The method of claim 11, further comprising, responsive to detecting that the input element has been rotated from the resting position, resizing content displayed on a display screen of the information handling device.

18. The method of claim 17, wherein the content is resized to accommodate the input element overlaying a portion of the display screen.

19. The method of claim 18, wherein the portion of the display screen is collocated with an area of the display screen occupied by a virtual keyboard.

20. A program product, comprising:
a storage device having computer readable program code stored therewith, the computer readable program code comprising:
computer readable program code configured to detect that an input element connected at an end to a housing of an information handling device in a rotatable fashion has been rotated from a resting position;
the input element having an input surface and another surface that is opposite to the input surface; and
computer readable program code configured to, responsive to detecting that the input element has been rotated from the resting position, accept one or more user inputs via the input surface;
wherein, in the resting position, the input surface of the input element is fit in a cavity of the housing and the another side of the input element forms a part of the housing exterior surface.

* * * * *